(12) United States Patent
Durrant et al.

(10) Patent No.: US 6,676,299 B1
(45) Date of Patent: Jan. 13, 2004

(54) DEVICE HAVING MULTIPLE OPTICAL FIBERS

(75) Inventors: Richard C. E. Durrant, Suffolk (GB); Mark Krowiak, Schaumburg, IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 10/290,852

(22) Filed: Nov. 8, 2002

(51) Int. Cl.[7] ............................................. G02B 6/38
(52) U.S. Cl. ........................................... 385/71; 385/59
(58) Field of Search ............................. 385/71, 76, 86, 385/53, 54, 56, 59

(56) References Cited

U.S. PATENT DOCUMENTS

| | | | | |
|---|---|---|---|---|
| 4,964,688 A | * | 10/1990 | Caldwell et al. | 385/56 |
| 5,214,730 A | * | 5/1993 | Nagasawa et al. | 385/59 |
| 5,315,678 A | * | 5/1994 | Maekawa et al. | 385/59 |
| 5,379,360 A | * | 1/1995 | Ota et al. | 385/59 |
| 5,867,620 A | | 2/1999 | Bunin et al. | 385/53 |
| 5,909,528 A | * | 6/1999 | Tamekuni et al. | 385/137 |

OTHER PUBLICATIONS

U.S. patent application Ser. No. 10/231,563, filed Sep. 3, 2002.

\* cited by examiner

*Primary Examiner*—Tulsidas Patel
(74) *Attorney, Agent, or Firm*—Karl D. Kovach

(57) ABSTRACT

A device includes two optical fibers bonded to a body. The body has a mating end and a splicing end. Each of the two optical fibers has a respective polished end and splicing end. The polished end of each of the two optical fibers is situated adjacent to and flush with the mating end of the body. The length of the two optical fibers is the same, where the length is defined by the distance from the splicing end to the polished end. The length of the two optical fibers is greater than the length of the body as defined by the distance from the mating end to the splicing end of the body. The length of the two optical fibers is less than fifty millimeters. The two optical fibers are parallel to one another.

16 Claims, 12 Drawing Sheets

DEVICE HAVING MULTIPLE OPTICAL FIBERS

BACKGROUND OF THE INVENTION

1. Field of the Invention

The present invention pertains to the field of fiber optics. The invention more particularly concerns a device which provides for the termination of multiple optical fibers in a single ferrule.

2. Discussion of the Background

During the late 1990s and into the early 2000s, optical fiber based data transmission systems flourished. Optical fiber based systems were installed in buildings, between buildings in the same city, between buildings in different cities, and between buildings on different continents.

Optical fibers are also installed on spans which are not so expansive. Optical fibers run between devices, such as host devices used for communication or data transmission, housed within the same building. Multiple host devices are typically installed in rack-like structures. The back side of the rack structure can become entangled with multiple optical fibers. The optical fibers run between host devices located in the same rack and between host devices located on different racks. Finding a single optical fiber out of the large group of entangled optical fibers is a frustrating and time consuming process. Additionally, when optical fibers become entangled some of the optical fibers can be stressed and bent past their permissible bend radii, thus leading to optical power loss of the transmitted signal and potentially a catastrophic fracture failure of the optical fiber itself.

To combat the problem, some end-users have tried to organize the optical fibers by color coding optical fibers and also by grouping some of the optical fibers, in certain locations, together with tie-wraps. A more logical and organized approach to the management of optical fibers is provided by Advanced Interconnection Technologies, a Stratos Lightwave, Inc., company, and is commonly known as flex circuitry which can be an optical backplane. In a basic form, flex circuitry includes a flexible polymer layer onto which is applied optical fibers in a pre-set arrangement and then a second flexible polymer layer is placed on top of the optical fibers and affixed to the first flexible polymer layer so as to encase and protect and maintain the arrangement of the optical fibers. The optical fibers are typically terminated with one or a combination of more than one of the now well known fiber optic connectors, such as MT, MP, MTP/MPO, MPX, MAC, HBMT, OGI, and other connector form factors.

The ferrule 91 of FIG. 1 is an MT-style multi-fiber optic device. The device includes a body 92 which has alignment holes 93, 94 and apertures which accommodate terminated ends 95 of optical fibers at a mating end 101, and a window 98. The body 92 is formed by flowing a resin into a mold. The optical fibers 97 of the multi-fiber optical cable 96 are inserted into the body 92 until their ends are nearly flush with the mating end 101. Then an adhesive such as an epoxy is introduced into the window 98 so as to affix the multi-fiber optical cable stripped of its matrix 97 to the body 92. By way of example, the multi-fiber optical cable 96 can be emanating from a flex circuit, or the ferrule can terminate a ribbon cable, or any device from which at least two optical fibers protrude.

Thus, there is a need for a method or device which terminates multiple optical fibers of a single ferrule which is less time consuming to assemble, is more reliable, and is more dimensionally accurate than known methods and devices.

SUMMARY OF THE INVENTION

Therefore, it is an object of the invention to provide a device having multiple optical fibers where the device is easily assembled.

It is another object of the present invention to provide a device having multiple optical fibers where the device is reliable.

It is still yet another object of the present invention to provide a method of making a device having multiple optical fibers.

In one form of the invention, the device includes two optical fibers and a body. The body has a mating end and a splicing end. Each of the two optical fibers has a respective polished end and splicing end. The polished end of each of the two optical fibers is situated adjacent to and flush with the mating end of the body. The length of the two optical fibers is the same, where the length is defined by the distance from the splicing end to the polished end. The first optical fiber of the two optical fibers has a first length, and the second optical fiber of the two optical fibers has a second length. The length of the two optical fibers is greater than the length of the body, where the length of the body is defined by the distance from the mating end to the splicing end of the body and is known as the third length. The length of the two optical fibers is less than fifty millimeters. The two optical fibers are parallel to one another. The two optical fibers form a plane. The two optical fibers are bonded to the body.

In another form of the invention, the device includes two optical fibers, a body, and a splice protector. The body has a mating end and a splicing end. Each of the two optical fibers has a respective polished end and splicing end. The polished end of each of the two optical fibers is situated adjacent to and flush with the mating end of the body. The length of the two optical fibers is the same, where the length is defined by the distance from the splicing end to the polished end. The first optical fiber of the two optical fibers has a first length, and the second optical fiber of the two optical fibers has a second length. The length of the two optical fibers is greater than the length of the body, where the length of the body is defined by the distance from the mating end to the splicing end of the body and is known as the third length. The length of the two optical fibers is less than fifty millimeters. The two optical fibers are parallel to one another. The two optical fibers form a plane. The two optical fibers are bonded to the body. The splice protector has a first end and a second end. The first end of the splice protector is mechanically associated with the body. The splice protector has an aperture. The second end of the splice protector is separated from the mating end of the body by a fourth length. The fourth length being greater than the first length of the first optical fiber. The splicing ends of the first and second optical fibers are situated in the aperture of the splice protector.

In a variation of the above-described device, the splice protector includes a recess instead of an aperture.

In yet another form of the invention, the device is constructed as set forth by the following steps: forming a body having a mating end and a splicing end, the body having a first aperture and a second aperture; inserting a first optical fiber into the first aperture of the body, the first optical fiber having a polishing end and a splicing end, the polishing end of the first optical fiber situated adjacent to the mating end of the body; inserting a second optical fiber into the second aperture of the body, the second optical fiber having a polishing end and a splicing end, the polishing end of the second optical fiber situated adjacent to the mating end of the body; polishing the first optical fiber and the second optical fiber adjacent to the mating end of the body; inserting optical fibers of a flex circuit through an aperture of a splice protector; positioning the splicing ends of the first and second optical fibers adjacent to ends of the optical fibers of the flex circuit; splicing the splicing ends of the first and second optical fibers to the ends of the optical fibers of the flex circuit so as to form a spliced area; and mechanically associating the splice protector with the body so as that the aperture of the splice protector encompasses the spliced area of the optical fibers.

Thus, the device having multiple optical fibers and the method of making the same is superior to existing solutions since the resulting device is reliable, and is easy to assemble as compared to prior art devices and practices.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 2:
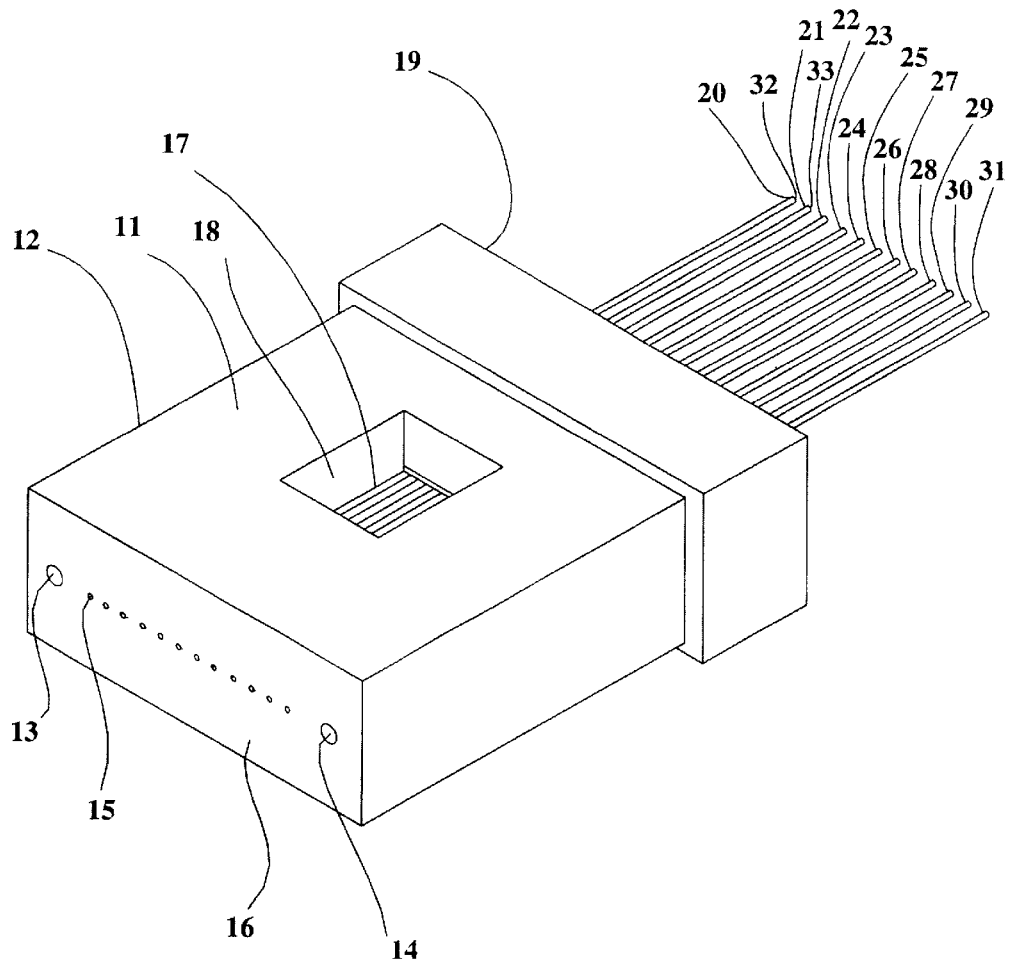
FIG. 2 is a perspective view of a device having multiple optical fibers.
Figure 3:
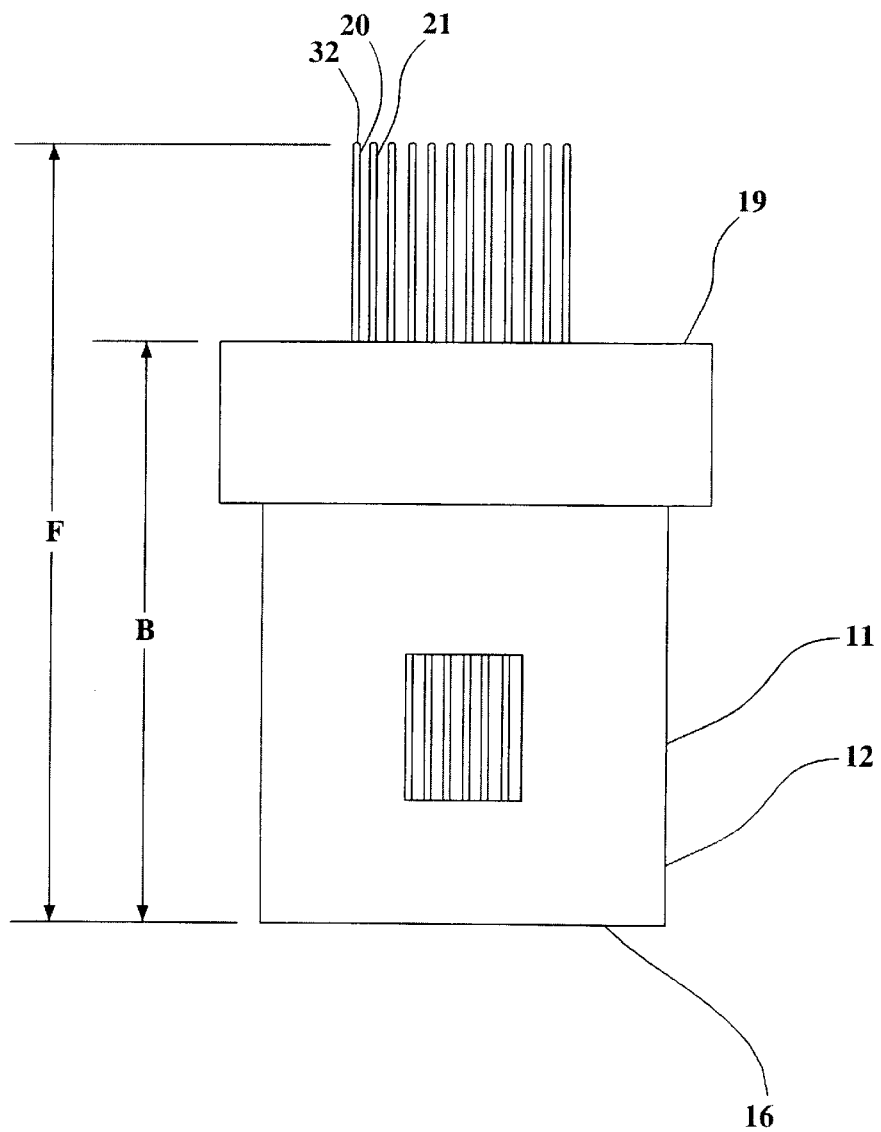
FIG. 3 is a plan view of the device of FIG. 2.

Referring now to the drawings, wherein like reference numerals designate identical or corresponding parts throughout the several views, and more particularly to FIGS. 2 and 3 thereof, is a device 11.

Figure 1:
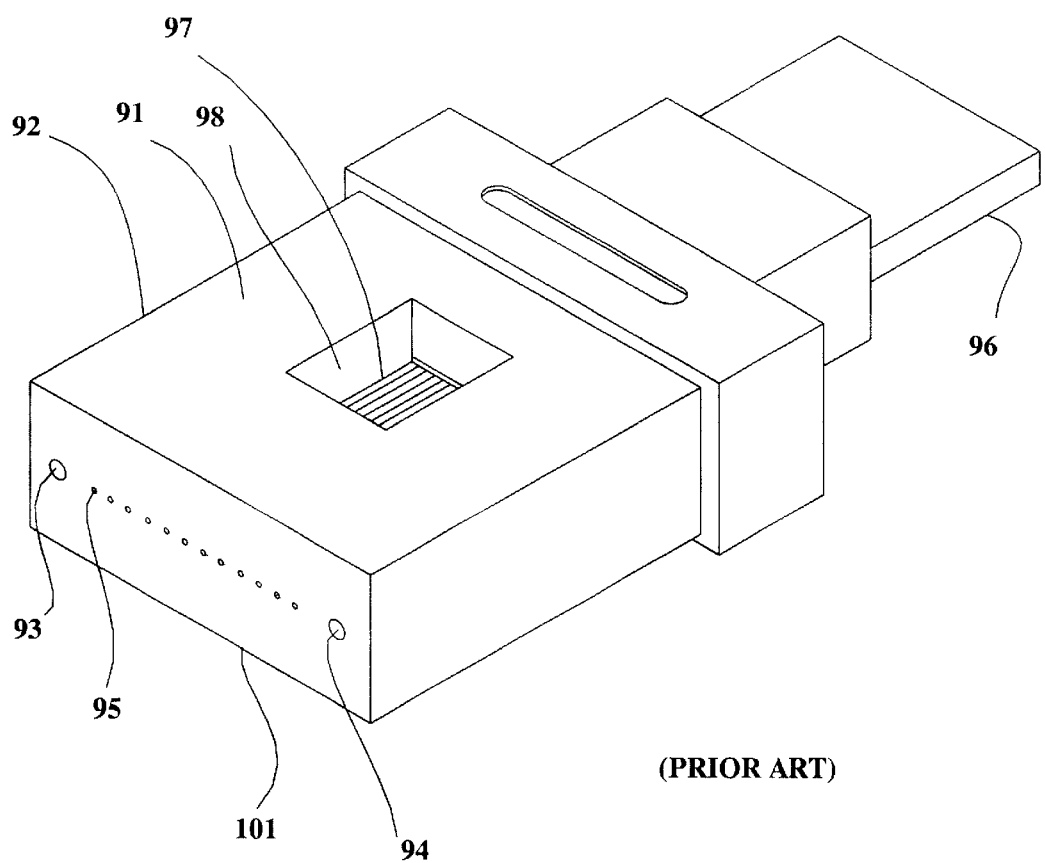
FIG. 1 is a perspective view of a prior art device having multiple optical fibers.

FIG. 2 is a perspective view of a device 11 which includes a body 12 and optical fibers 20, 21, 22, 23, 24, 25, 26, 27, 28, 29, 30, and 31. The body 12 includes a mating end 16 and a splicing end 19. The mating end 16 includes alignment holes 13, 14, where the alignment holes 13, 14 serve the same purpose as the alignment holes 93, 94 of the device 91 shown in FIG. 1. The device 11 of FIG. 2 at the mating end 16 has dimensions which are similar to dimension found on the standard MT-style ferrule. Ends 15 of the optical fibers 20–31 are terminated at the mating end 16 of the body 12 through apertures formed in the body 12.

The ends 15 are polishing ends of the optical fibers 20–31. Once the optical fibers 20–31 are bonded to the body 12 by way of an adhesive, the ends 15 of the optical fibers are cleaved and then polished substantially flush with the mating end 16 of the body 12. Moreover, the body 12 includes a window 18 through which the adhesive may be applied to the optical fibers located in the window 18. Numeral designator 17 denotes one of the optical fibers 20–31 located in the region of the window 18. In addition to having a polishing or polished end, each optical fiber 20–31 has a splicing end where the length of the optical fibers are provided by mechanical cleaving, or by way of ablation, or by other cleaving processes, of the optical fibers at a suitable location so as to provide the splicing end. By way of example, the splicing ends of optical fibers 20, 21 are denoted by numeral designators 32, 33, respectively. Typically, the optical fibers 20–31 are made of glass and may be either multi-mode or single mode optical fibers. The body 12 is typically made of a polymer material.

FIG. 3 is a plan view of the device 11 of FIG. 2. The length of the optical fibers 20–31 are substantially the same. A first optical fiber 20 and a second optical fiber 21 are shown to have a length denoted by the alphabetic character F. The length F is measured from the polishing end 15 to the splicing end 32 of the first optical fiber 20. The second optical fiber 21 is measured in the same way. The optical fibers 20–31 are substantially parallel to one another and they form a plane. The length of the body 12 is measured from the mating end 16 to the splicing end 19 and is denoted by the alphabetic character B. As shown in FIG. 3, the length F of the optical fibers 20–31 is greater than the length B of the body 12. Typically, the length F of the optical fibers 20–31 is less than fifty millimeters.

The device 11 of FIGS. 2 and 3 is suitable for mass production. The device 11 is made and tested. Each optical fiber 20–31 is tested for optical acceptability and is polished on one end and is cleaved on the other end so as to form a surface which is easily spliced. The body 12 is tested for dimensional accuracy. Thus, the device 11 can be produced and stored in large quantities. When the market place demands more terminations having the pre-made device 11, the device 11 is taken out of storage and is spliced to optical fibers of another device along the splicing ends 32, 33 of the optical fibers 20–31 of the device 11. Therefore, the device 11 allows for the low cost production of high quality terminations which traditionally are time consuming and expensive to make.

Figure 4:
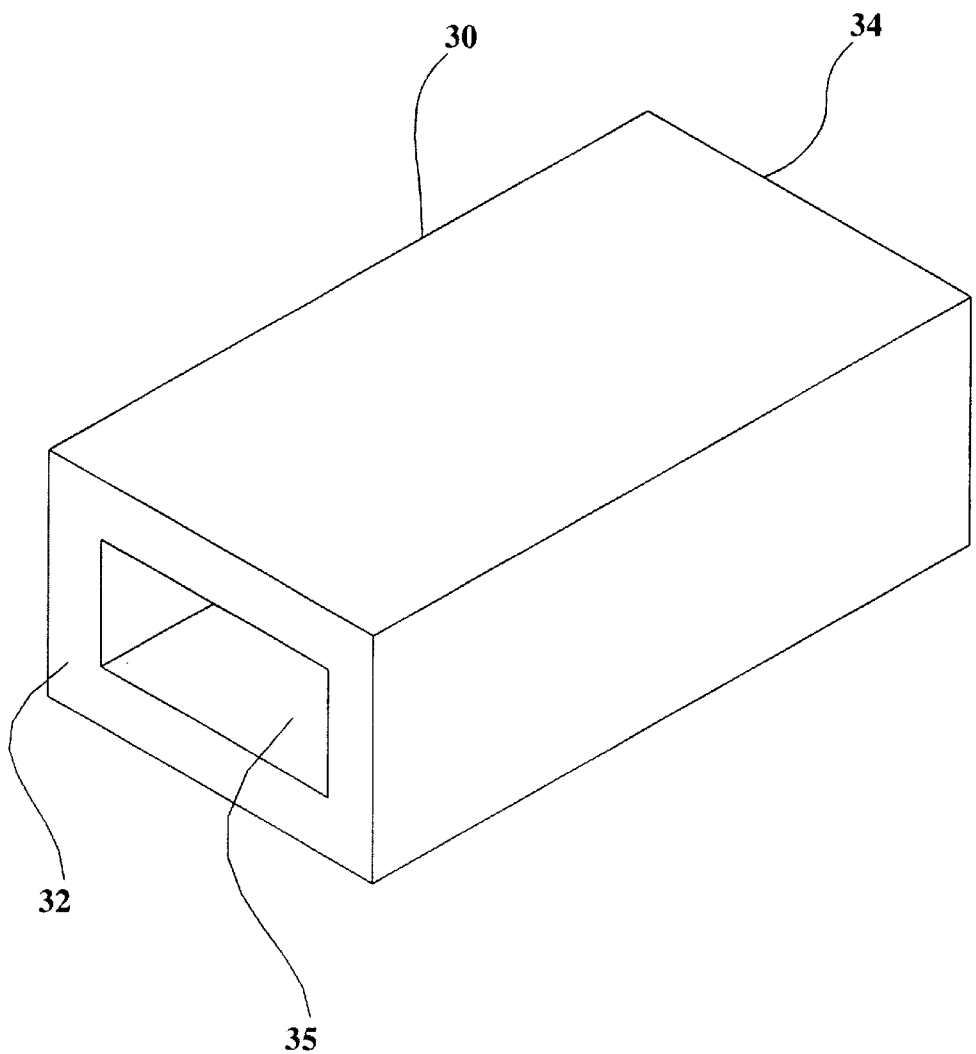
FIG. 4 is a perspective view of a splice protector.
Figure 5:
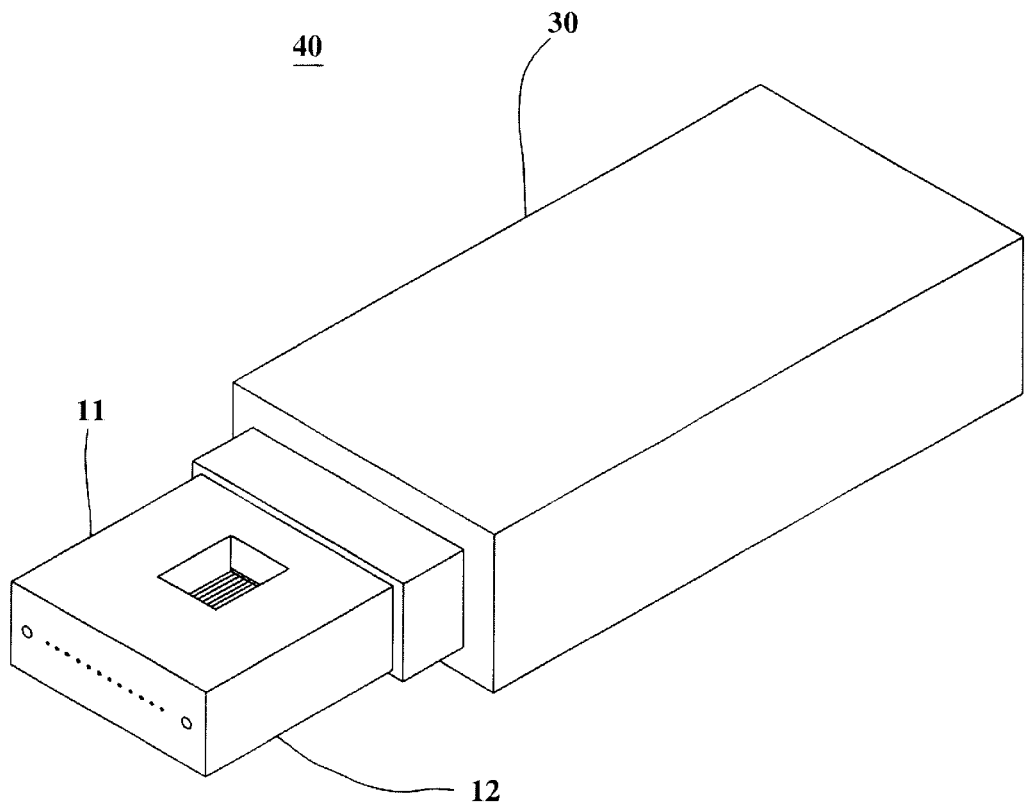
FIG. 5 is a perspective view of the body of FIG. 2, and the splice protector of FIG. 4.
Figure 6:
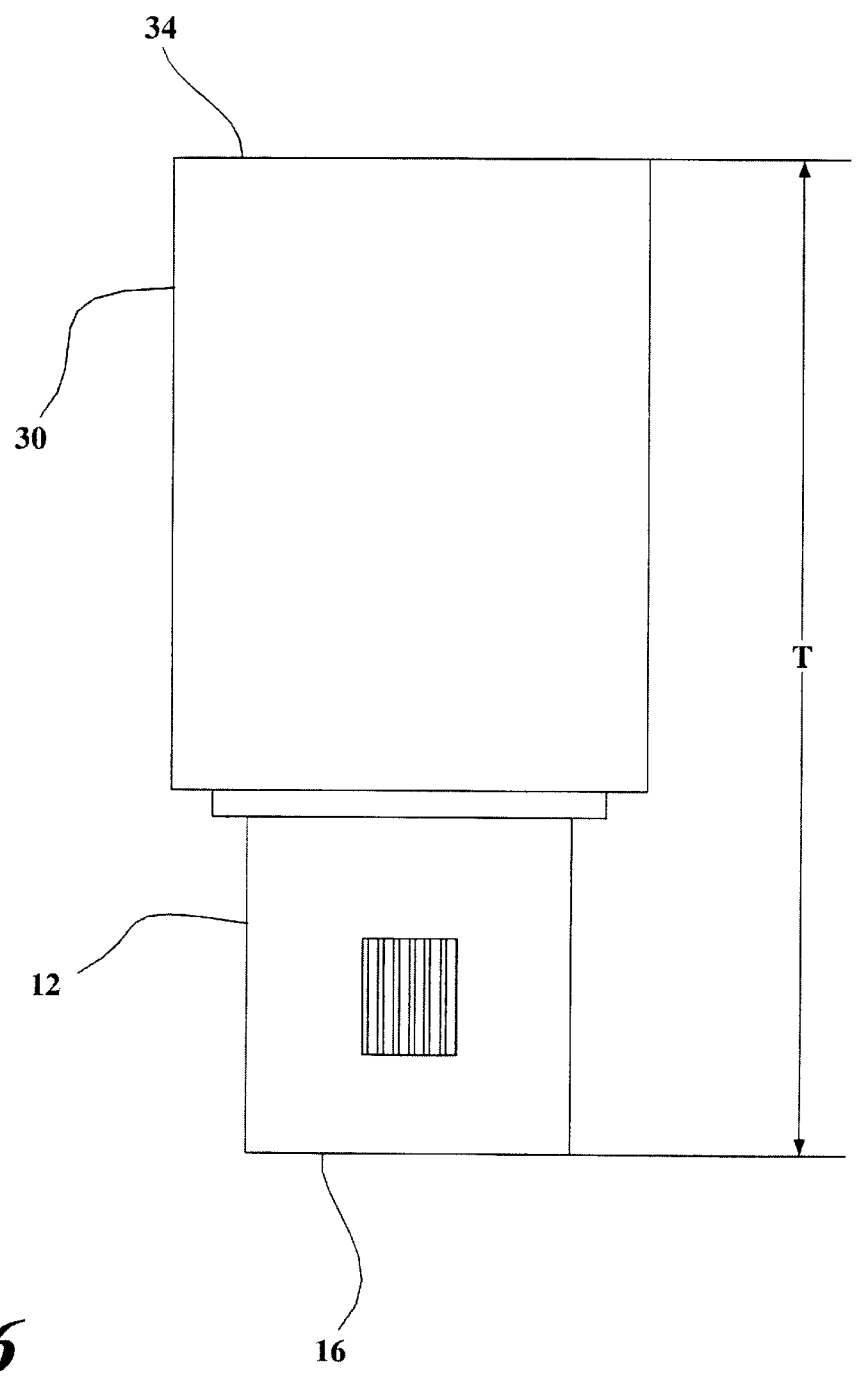
FIG. 6 is a plan view of the device of FIG. 5.

FIGS. 4–6 show the components of another embodiment of the device 40. The device 40 incorporates the body 11, and optical fibers 20–31 of the device 11 as shown in FIGS. 2 and 3, and adds thereto the splice protector 30 as shown in FIG. 4. FIG. 4 is a perspective view of the splice protector 30. The splice protector 30 includes a first end 32, a second end 34, and an aperture 35 extending from the first end 32 to the second end 34. Preferably, the splice protector 30 is made of a polymer material, where the polymer material is transparent to U.V. radiation. Furthermore, the splice protector 30 is shown to be of one piece, however, the splice protector 30 can be composed of several piece parts.

FIG. 5 is a perspective view of the device 11 of FIGS. 2 and 3 and the splice protector 30 mechanically associated with the body 12 of the device 11 of FIGS. 2 and 3 so as to form the new embodiment of the device 40. The splice protector 30 can be mounted directly to the body 12 near the splicing end 19 of the body 12 or the splice protected 30 can be mounted indirectly to the body 12 by way of an intermediary device such as a sleeve or standoff (not shown). The splicing ends 32, 33 of the optical fibers 20–31 are situated in the aperture 35 of the splice protector 30.

FIG. 6 is a plan view of the device 40 of FIG. 5. The length of the device 40 is measured from the mating end 16 of the body 12 to the second end 34 of the splice protector 30 and is denoted by the alphabetic character T. The length T of the device 40 is greater than the length F of the optical fibers 20–31. Therefore, the splicing ends 32, 33 of the optical fibers 20–31 do not protrude beyond the second end 34 of the splice protector 30.

Figure 7:
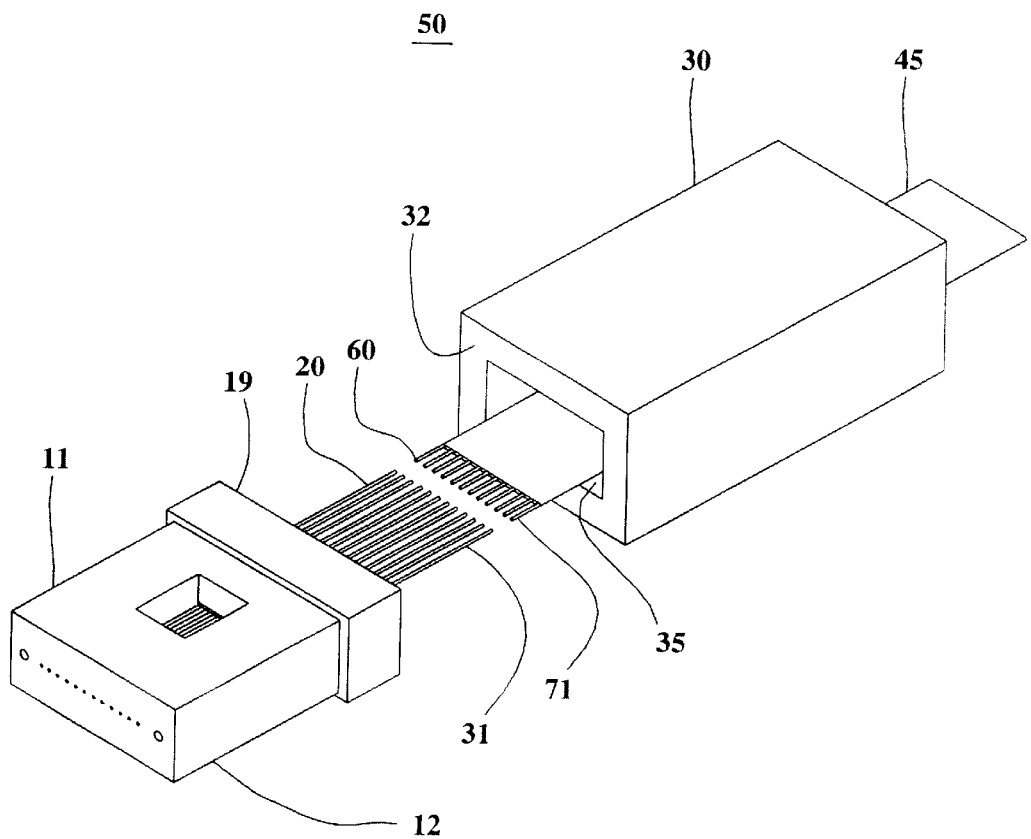
FIG. 7 is a perspective view of the body of FIG. 2, the splice protector of FIG. 4, and a multi-fiber optic segment extending from a flex circuit.

FIG. 7 is an exploded perspective view of the body 12, optical fibers 20–31, the splice protector 30, and a multi-fiber optic segment or cable 45 extending, for example, from a flex circuit, so as to form yet another embodiment of the device 50. In practice, matrix material is removed from a portion of the multi-fiber optic cable 45 so as to expose free ends of the optical fibers 60–71 residing therein. The optical fibers 60–71 are then thread through the aperture 35 of the splice protector 30. The free ends of the optical fibers 60–71 are then position adjacent to the splicing ends 32, 33 of the optical fibers 20–31. The optical fibers 20–31 are then spliced to the optical fibers 60–71. The splicing technique can be mechanical or by way of applying heat with a lapsing device. Once the splicing step is completed, the splice protector 30 is moved toward the body 12, where the splice protector 30 is mechanically associated with the body 12 so as to form the device 50. The splice protector 30 can be directly or indirectly attached to the body 12 by application of adhesives or by press fitting or by other attachment methods well known in the art.

Figure 8:
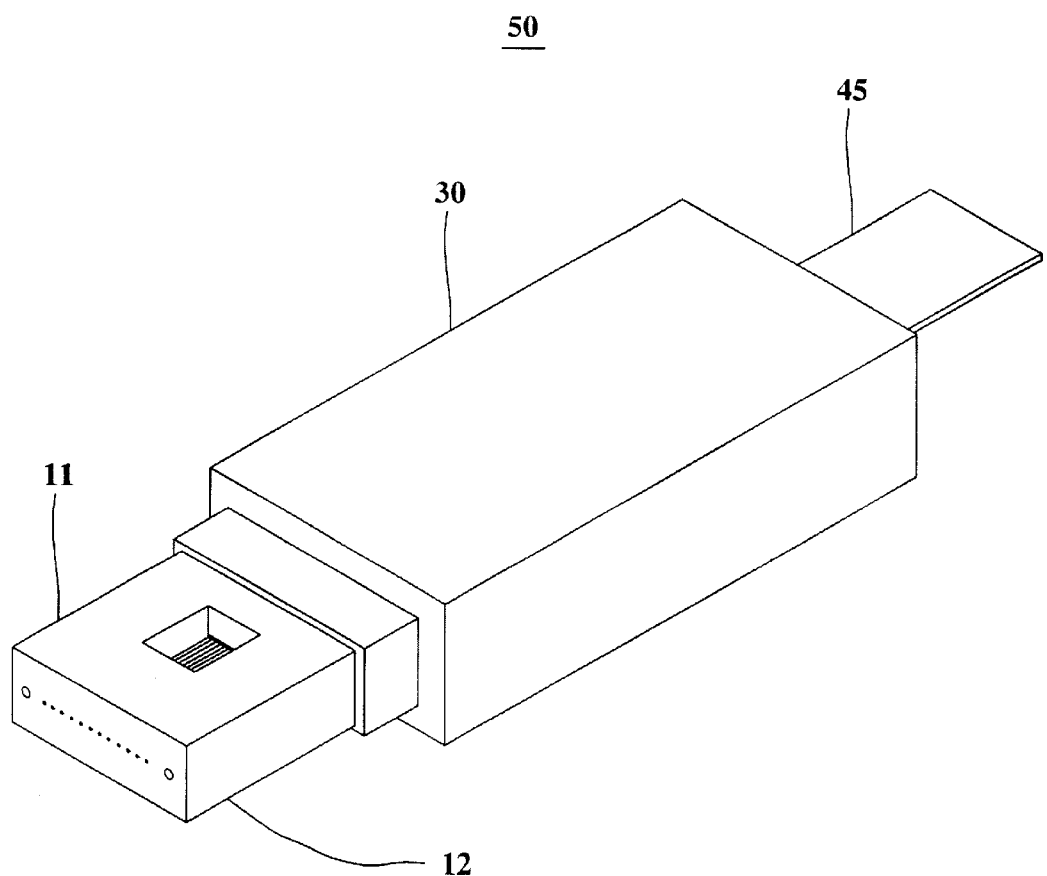
FIG. 8 is a perspective view of the assembled device of FIG. 7.

FIG. 8 is a perspective view of the assembled device 50 of FIG. 7. Since the length T from the mating end 16 of the body 12 to the second end 34 of the splice protector 30 is greater than the length F of the optical fibers 20–31, the splice protector 30 protects the area surrounding the location of the splice from being excessively bent and strained.

Preferably, a coefficient of thermal expansion of the glass material of the optical fibers 20–31 is substantially the same as a coefficient of thermal expansion of the polymer material of the body 12. Furthermore, it is preferable that the coefficient of thermal expansion of the polymer material of the body 12 is substantially the same as a coefficient of thermal expansion of the polymer material of the splice protector 30. Additionally, it is preferable that the coefficient of thermal expansion of the polymer material of the body 12 is substantially the same as a coefficient of thermal expansion of the adhesive material.

Figure 9:
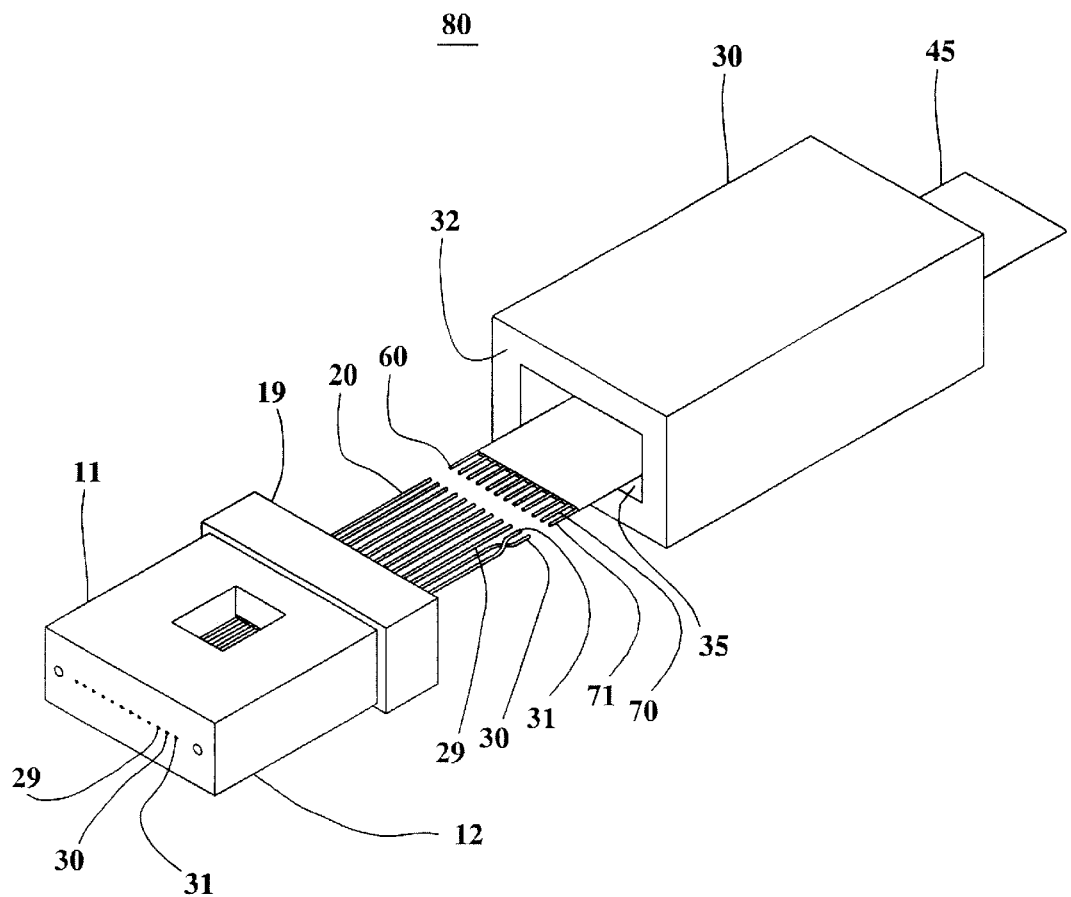
FIG. 9 is a perspective view of another embodiment of the invention incorporating a cross over of optical fibers.
Figure 12:
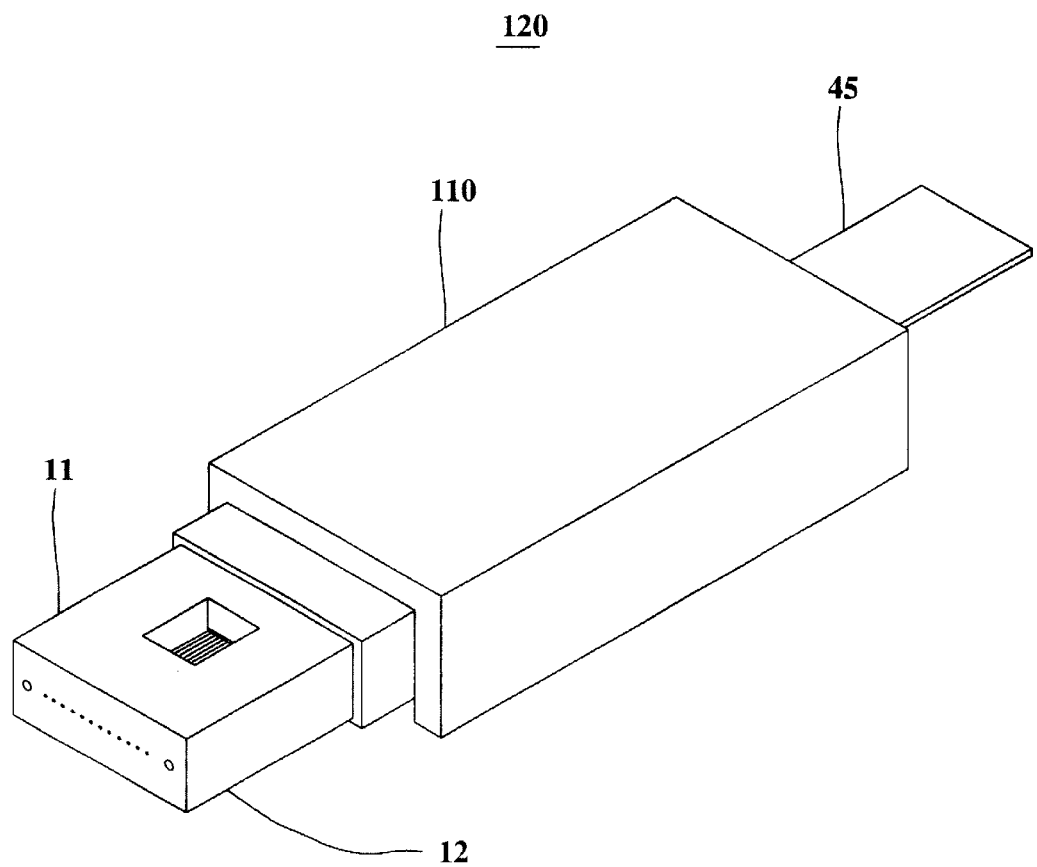
FIG. 12 is a perspective view of the assembled device of FIG. 11.

FIG. 9 is an exploded perspective view of the body 12, optical fibers 20–31, the splice protector 30, and a multi-fiber optic segment or cable 45 extending, for example, from a flex circuit, so as to form yet another embodiment of the device 80. The device 80 of FIG. 9 employs the same parts as the device 50 of FIG. 7. The two devices 50, 80 differ in that the device 80 of FIG. 9 re-routes the order or sequence of two of the optical fibers 20–31. As shown in FIG. 9 at the mating end of the body 12, three of the optical fibers 31, 30, 29 are shown in sequence starting from the outermost optical fiber toward the more inwardly situated optical fiber. At the splicing end of the optical fibers 20–31 of the body 12, FIG. 12 shows the sequence of the three optical fibers 31, 30, 29 has changed so that the sequence of optical fibers is 30, 31, 29. Thus, the first and second optical fibers changed sequence. Once the optical fibers 20–31 are properly aligned, they are spliced to the optical fibers 60–71. In this case, optical fiber 31 is spliced to optical fiber 70, and optical fiber 30 is spliced to optical fiber 71.

By contrast, in the device 50 of FIG. 7, optical fiber 31 was spliced to optical fiber 71, and optical fiber 30 was spliced to optical fiber 70. The crossed-over or re-routed optical fibers 30, 31 can be combined in other sequences and the remaining optical fibers 20–29 can be re-routed in other sequences also. Even though the optical fibers 20–31 may be crossed-over, the optical fiber 20–31 have approximately the same length. The construction of device 80 is then completed as is the device 50 of FIG. 7. The flexibility afforded by the re-routing of the optical fibers 20–31 of device 80 allows a manufacturer to build unique devices that can have the output sequence of optical fibers prescribed by the end-user.

Figure 10:
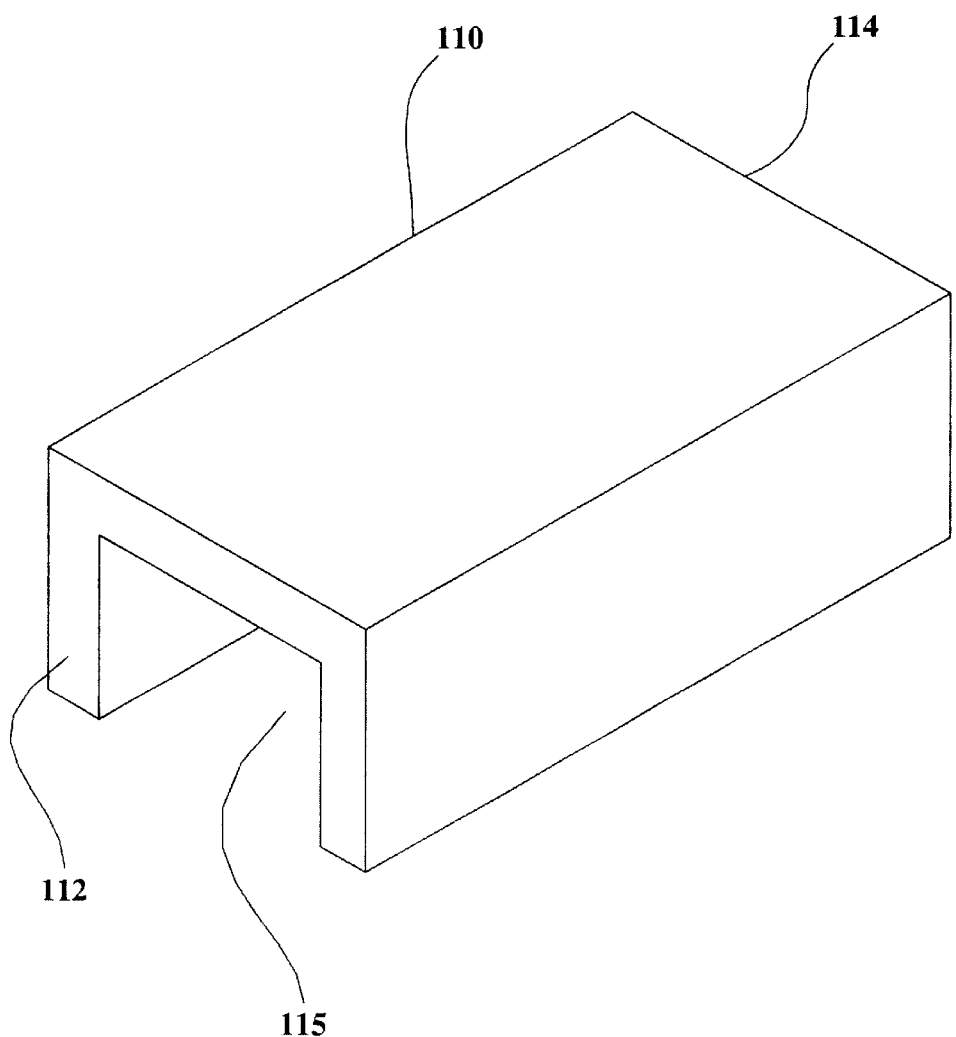
FIG. 10 is a perspective view of a splice protector having a recess.
Figure 11:
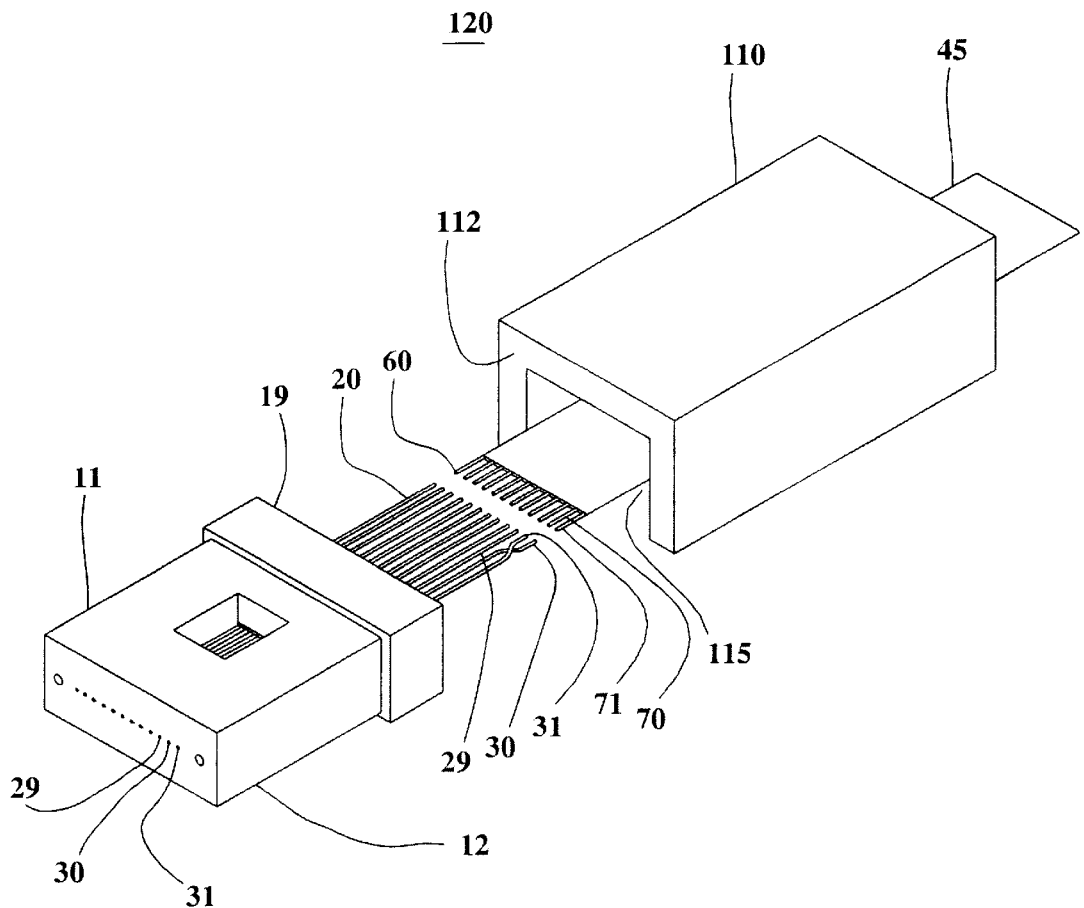
FIG. 11 is a perspective view of the body of FIG. 2, the splice protector of FIG. 10, and a multi-fiber optic segment.

FIGS. 10–12 show the components of another embodiment of the device 120. The device 120 incorporates the body 11, as shown in FIG. 2, and adds a splice protector 110, as shown in FIG. 10. The splice protector 110 is similar to the splice protector 30 shown in FIG. 4. The splice protector 30 shown in FIG. 4 includes an aperture 35. In contrast, the splice protector 110 includes a recess 115. The splice protector 110 has a first end 112 and a second end 114. FIG. 11 is an exploded perspective view of the body 11, the splice protector 110, and a multi-fiber optic segment. FIG. 12 is a perspective view of the assembled device 120 of FIG. 11. Assembly of the device 120 is similar to the assembly of the devices 50, 80 as above described. Since the splice protector 110 has a recess 115 the spliced optical fibers 20–31, 60–71 can be maintained within the recess 115 of the splice protector 110 by way of an adhesive material applied to the spliced optical fiber 20–31, 60–71 and the recess 115.

All of the devices 11, 40, 50, 80, and 120 show a body 12 which conforms to a MT-style standard. However, the mating end 16 of the body 12 of each of the devices 11, 40, and 50 can conform to any standard connector size including but not limited to MP, MTP/MPO, MPX, MAC, OGI, and HBMT.

Obviously, numerous modifications and variations of the present invention are possible in light of the above teachings. It is therefore to be understood that within the scope of the appended claims, the invention may be practiced otherwise than as specifically described herein.

What is claimed is:

1. A device comprising:
   a first optical fiber having a polished end and a splicing end, the polished end and the splicing end of the first optical fiber separated by a first length;
   a second optical fiber having a polished end and a splicing end, the polished end and the splicing end of the second optical fiber separated by a second length, the second length of the second optical fiber being substantially the same as the first length of the first optical fiber, the second optical fiber being substantially parallel to the first optical fiber, the second optical fiber and the first optical fiber form a plane, and the second length of the second optical fiber being less than fifty millimeters;
   a body having a mating end and a splicing end, the mating end and the splicing end of the body separated by a third length, the first optical fiber bonded to the body, the second optical fiber bonded to the body, the polished end of the first optical fiber and the polished end of the second optical fiber being substantially flush with the mating end of the body, and the third length of the body being less than the first length of the first optical fiber; and
   an adhesive material positioned between the first optical fiber and the body, and between the second optical fiber and the body so as to bond the first optical fiber to the body, and to bond the second optical fiber to the body, and wherein the body has a first aperture, the first aperture extending from the mating end to the splicing end, a first portion of the first optical fiber positioned in the first aperture, and wherein the body has a second aperture, the second aperture extending from the mating end to the splicing end, a second portion of the second optical fiber positioned in the second aperture, and wherein the body is made of a polymer material, and wherein the first optical fiber is made from a glass material, and wherein the second optical fiber is made from a glass material, and wherein a coefficient of thermal expansion of the glass material of the first optical fiber is substantially the same as a coefficient of thermal expansion of the polymer material of the body, and wherein a coefficient of thermal expansion of the adhesive material is substantially the same as the coefficient of thermal expansion of the polymer material of the body.

2. A device according to claim 1 wherein the device is compatible with and mateable to a receptacle for a connector where the connector is selected from the group consisting of MT, MP, MTP/MPO, MPX, MAC, OGI, and HBMT style connectors.

3. A device comprising:

a first optical fiber having a polished end and a splicing end, the polished end and the splicing end of the first optical fiber separated by a first length;

a second optical fiber having a polished end and a splicing end, the polished end and the splicing end of the second optical fiber separated by a second length, the second length of the second optical fiber being substantially the same as the first length of the first optical fiber, the second optical fiber being substantially parallel to the first optical fiber, the second optical fiber and the first optical fiber form a plane, and the second length of the second optical fiber being less than fifty millimeters;

a body having a mating end and a splicing end, the mating end and the splicing end of the body separated by a third length, the first optical fiber bonded to the body, the second optical fiber bonded to the body, the polished end of the first optical fiber and the polished end of the second optical fiber being substantially flush with the mating end of the body, and the third length of the body being less than the first length of the first optical fiber; and a splice protector having a first end and a second end, the first end of the splice protector mechanically associated with the body, the splice protector having an aperture, and the second end of the splice protector separated from the mating end of the body by a fourth length, the fourth length being greater than the first length of the first optical fiber, and wherein the splicing end of the first optical fiber is situated in the aperture of the splice protector, and the splicing end of the second optical fiber is situated in the aperture of the splice protector.

4. A device according to claim 3, further comprising an adhesive material positioned between the first optical fiber and the body, and between the second optical fiber and the body so as to bond the first optical fiber to the body, and to bond the second optical fiber to the body.

5. A device according to claim 4 wherein the body has a first aperture, the first aperture extending from the mating end to the splicing end, a first portion of the first optical fiber positioned in the first aperture, and wherein the body has a second aperture, the second aperture extending from the mating end to the splicing end, a second portion of the second optical fiber positioned in the second aperture.

6. A device according to claim 5 wherein the body is made of a polymer material.

7. A device according to claim 6 wherein the splice protector is made of a polymer material which is transparent to U.V. radiation.

8. A device according to claim 7 wherein the first optical fiber is made from a glass material, and wherein the second optical fiber is made from a glass material.

9. A device according to claim 8 wherein a coefficient of thermal expansion of the glass material of the first optical fiber is substantially the same as a coefficient of thermal expansion of the polymer material of the body, and wherein a coefficient of thermal expansion of the adhesive material is substantially the same as the coefficient of thermal expansion of the polymer material of the body.

10. A device according to claim 9 wherein the device is compatible with and mateable to a receptacle for a connector where the connector is selected from the group consisting of MT, MP, MAX, MU, MAC, OGI, and HBMT style connectors.

11. A device according to claim 10, further comprising a third optical fiber of a flex circuit, the third optical fiber having a free end, the free end of the third optical fiber spliced to the splicing end of the first optical fiber, and further comprising a fourth optical fiber of the flex circuit, the fourth optical fiber having a free end, the free end of the fourth optical fiber spliced to the splicing end of the second optical fiber.

12. A device comprising:

a first optical fiber having a polished end and a splicing end, the polished end and the splicing end of the first optical fiber separated by a first length;

a second optical fiber having a polished end and a splicing end, the polished end and the splicing end of the second optical fiber separated by a second length, the second length of the second optical fiber being substantially the same as the first length of the first optical fiber, the second optical fiber being substantially parallel to the first optical fiber, the second optical fiber and the first optical fiber form a plane, and the second length of the second optical fiber being less than fifty millimeters;

a body having a mating end and a splicing end, the mating end and the splicing end of the body separated by a third length, the first optical fiber bonded to the body, the second optical fiber bonded to the body, the polished end of the first optical fiber and the polished end of the second optical fiber being substantially flush with the mating end of the body, and the third length of the body being less than the first length of the first optical fiber; and a splice protector having a first end and a second end, the first end of the splice protector mechanically associated with the body, the splice protector having a recess, and the second end of the splice protector separated from the mating end of the body by a fourth length, the fourth length being greater than the first length of the first optical fiber, and wherein the splicing end of the first optical fiber is situated in the recess of the splice protector, and the splicing end of the second optical fiber is situated in the recess of the splice protector.

13. A method of making a device comprising the steps of:

forming a body having a mating end and a splicing end, the body having a first aperture and a second aperture;

inserting a first optical fiber into the first aperture of the body, the first optical fiber having a polishing end and a splicing end, the polishing end of the first optical fiber situated adjacent to the mating end of the body;

inserting a second optical fiber into the second aperture of the body, the second optical fiber having a polishing end and a splicing end, the polishing end of the second optical fiber situated adjacent to the mating end of the body;

polishing the first optical fiber and the second optical fiber adjacent to the mating end of the body;

inserting optical fibers of a flex circuit through an aperture of a splice protector;

positioning the splicing ends of the first and second optical fibers adjacent to ends of the optical fibers of the flex circuit;

splicing the splicing ends of the first and second optical fibers to the ends of the optical fibers of the flex circuit so as to form a spliced area; and mechanically associating the splice protector with the body so as that the aperture of the splice protector encompasses the spliced area.

14. A method according to claim 13 wherein the step of splicing is achieved by way of a lapsing device.

15. A device comprising:

a first optical fiber having a polished end and a splicing end, the polished end and the splicing end of the first optical fiber separated by a first length;

a second optical fiber having a polished end and a splicing end, the polished end and the splicing end of the second optical fiber separated by a second length, the second length of the second optical fiber being substantially the same as the first length of the first optical fiber;

a third optical fiber having a polished end and a splicing end, the polished end and the splicing end of the third optical fiber separated by a third length, the third length of the third optical fiber being substantially the same as the first length of the first optical fiber, and the third length of the third optical fiber being less than fifty millimeters, and wherein the first optical fiber, the second optical fiber, and the third optical fiber form a plane;

a body having a mating end and a splicing end, the mating end and the splicing end of the body separated by a fourth length, the first optical fiber bonded to the body, the second optical fiber bonded to the body, the third optical fiber bonded to the body, the polished end of the first optical fiber, the polished end of the second optical fiber, and the polished end of the third optical fiber being substantially flush with the mating end of the body, and the fourth length of the body being less than the first length of the first optical fiber, and the polished end of the first optical fiber and the polished end of the third optical fiber straddle the polished end of the second optical fiber; and a splice protector having a first end and a second end, the first end of the splice protector mechanically associated with the body, the splice protector having an aperture, and the second end of the splice protector separated from the mating end of the body by a fifth length, the fifth length being greater than the first length of the first optical fiber, and wherein the splicing end of the first optical fiber is situated in the aperture of the splice protector, the splicing end of the second optical fiber is situated in the aperture of the splice protector, and the splicing end of the third optical fiber is situated in the aperture of the splice protector, and the splicing end of the second optical fiber and the splicing end of the third optical fiber straddle the splicing end of the first optical fiber.

16. A device according to claim 15, further comprising a fourth optical fiber of a flex circuit, the fourth optical fiber having a free end, the free end of the fourth optical fiber spliced to the splicing end of the second optical fiber, and further comprising a fifth optical fiber of the flex circuit, the fifth optical fiber having a free end, the free end of the fifth optical fiber spliced to the splicing end of the first optical fiber, and further comprising a sixth optical fiber of the flex circuit, the sixth optical fiber having a free end, the free end of the sixth optical fiber spliced to the splicing end of the third optical fiber, and wherein the free end of the fourth optical fiber and the free end of the sixth optical fiber straddle the free end of the fifth optical fiber.

* * * * *